United States Patent
Teijido et al.

(10) Patent No.: US 11,665,174 B2
(45) Date of Patent: May 30, 2023

(54) METHOD AND SYSTEM FOR MULTI-TIERED, MULTI-COMPARTMENTED DEVOPS

(71) Applicant: Raytheon Company, Waltham, MA (US)

(72) Inventors: Daniel Teijido, Clearwater, FL (US); Vincent E. Fogle, Jr., Largo, FL (US); Ledford J. Meadows, III, Largo, FL (US); Glenn R. Kaufman, Largo, FL (US); David Templeton, Swifton, AR (US)

(73) Assignee: Raytheon Company, Waltham, MA (US)

( * ) Notice: Subject to any disclaimer, the term of this patent is extended or adjusted under 35 U.S.C. 154(b) by 269 days.

(21) Appl. No.: 17/162,920

(22) Filed: Jan. 29, 2021

(65) Prior Publication Data

US 2022/0247756 A1  Aug. 4, 2022

(51) Int. Cl.
*H04L 9/40* (2022.01)
*G06F 8/10* (2018.01)
*G06F 8/30* (2018.01)

(52) U.S. Cl.
CPC .............. *H04L 63/105* (2013.01); *G06F 8/10* (2013.01); *H04L 63/20* (2013.01); *G06F 8/30* (2013.01)

(58) Field of Classification Search
CPC ......... H04L 63/105; H04L 63/20; G06F 8/10; G06F 8/30; G06F 8/71; G06F 21/6218; G06F 8/60

USPC .......................................................... 726/1
See application file for complete search history.

(56) References Cited

U.S. PATENT DOCUMENTS

| | | | |
|---|---|---|---|
| 7,103,600 B2* | 9/2006 | Mullins | G06F 16/289 |
| 7,840,673 B1* | 11/2010 | O'Crowley | H04L 69/40 |
| | | | 709/224 |
| 8,234,693 B2 | 7/2012 | Stahl et al. | |
| 8,745,385 B2 | 6/2014 | Coding et al. | |
| 9,292,881 B2 | 3/2016 | Alperovitch et al. | |
| 9,489,534 B2 | 11/2016 | Hashii et al. | |
| 9,742,560 B2 | 8/2017 | Simon et al. | |
| 9,971,910 B2 | 5/2018 | Kling et al. | |
| 10,691,618 B2* | 6/2020 | Xing | G06F 21/6218 |

(Continued)

FOREIGN PATENT DOCUMENTS

WO  WO2016195880 A1  12/2016

*Primary Examiner* — Kambiz Zand
*Assistant Examiner* — Aubrey H Wyszynski
(74) *Attorney, Agent, or Firm* — Kinney & Lange, P.A.

(57) ABSTRACT

A method of providing a secure development operations system that can accommodate multiple projects, multiple tenants, and multiple security classifications includes creating a first sub-program with the first sub-program being part of a first project and designating the first sub-program with a first security classification label. The method also includes transferring the first sub-program to a first repository of the development operations system with the first repository being configured to contain sub-programs associated with the first project and transferring a copy of the first sub-program to a second repository of the development operations system. The second repository is configured to contain sub-programs from multiple projects and sub-programs that have different security classification labels.

20 Claims, 2 Drawing Sheets

(56) References Cited

U.S. PATENT DOCUMENTS

| | | |
|---|---|---|
| 10,713,077 B2 | 7/2020 | Pepus et al. |
| 2007/0016595 A1* | 1/2007 | Mullins ................ G06F 9/4493 |
| 2019/0050581 A1 | 2/2019 | Chhabra et al. |

* cited by examiner

METHOD AND SYSTEM FOR MULTI-TIERED, MULTI-COMPARTMENTED DEVOPS

FIELD OF THE INVENTION

The present disclosure relates generally to secure project development and management and, in particular, to providing a secure development operations (SecDevOps) system within a multi-tier, multi-compartmented network/environment.

BACKGROUND

SecDevOps (also knowns as DevSecOps or DevOpsSec) is the process of integrating secure development best practices and methodologies into development and deployment processes made possible by a DevOps approach. A SecDevOps environment is an important system in the secure design and development of projects, such as the creation of software programs, that require the collaborative work of multiple tenants/individuals/developers where the environments and developers do not all share a common formal security access authorization. The SecDevOps environment allows for automation and monitoring (at all steps of the development process) of the creation, integration, testing, and release of individual components/programs and the entirety of the project. In unclassified environments, the ability to utilize a traditional DevOps approach/system to allow tenants/developers to work collaboratively and share information is unencumbered by information security policies. In unclassified environments, tenants/developers within the DevOps system can easily and freely exchange information, such as individual components/programs, without concern for the security classification and need-to-know requirements associated with each program or classification authorization rights of the tenants/developers. This type of open sharing environment supports the DevOps approach to project development and management. However, the implementation of a traditional DevOps system is difficult in an environment in which the dissemination of information is controlled by security policies and the formal access requirements to that information. Further compounding the challenges, is the adjudication of the tenants/developers and their formal access rights to access classified need-to-know information. Thus, implementation of a SecDevOps system within a classified environment would be advantageous to the development and management of projects.

SUMMARY

In a first embodiment, the present disclosure concerns a method of providing a secure development operations system that can accommodate multiple projects, multiple tenants, and multiple security classifications. This method includes creating a first sub-program with the first sub-program being part of a first project and designating the first sub-program with a first security classification label. The classification label represents a security level (e.g., top secret) and one or more sensitivity or special access designations (e.g., brown, green, and blue). The method also includes transferring the first sub-program to a first repository of the development operations system with the first repository being configured to contain sub-programs associated with the first project and replicating a copy of the first sub-program to a second repository of the development operations system. The second repository is configured to contain sub-programs from multiple projects and sub-programs that have different security classification labels.

In a second embodiment, the present disclosure concerns a system for performing development operations in a secure environment. The system includes a first tenant workstation at which a first tenant is configured to create a first sub-program with the first sub-program being part of a first project and having a first security classification label designation. The system also includes a first repository for storage of the first sub-program with the first repository configured to store sub-programs associated with the first project and a second repository for storage of a copy of the first sub-program with the second repository configured to store sub-programs from multiple projects. The system can further include an enterprise security module that controls access to the first repository and the second repository with access to the first repository being limited to tenants associated with the first project and access to the copy of the first sub-program in the second repository being limited to tenants with a first security classification authorization.

The present summary is provided only by way of example, and not limitation. Other aspects of the present disclosure will be appreciated in view of the entirety of the present disclosure, including the entire text, claims, and accompanying figures.

Figure 1:
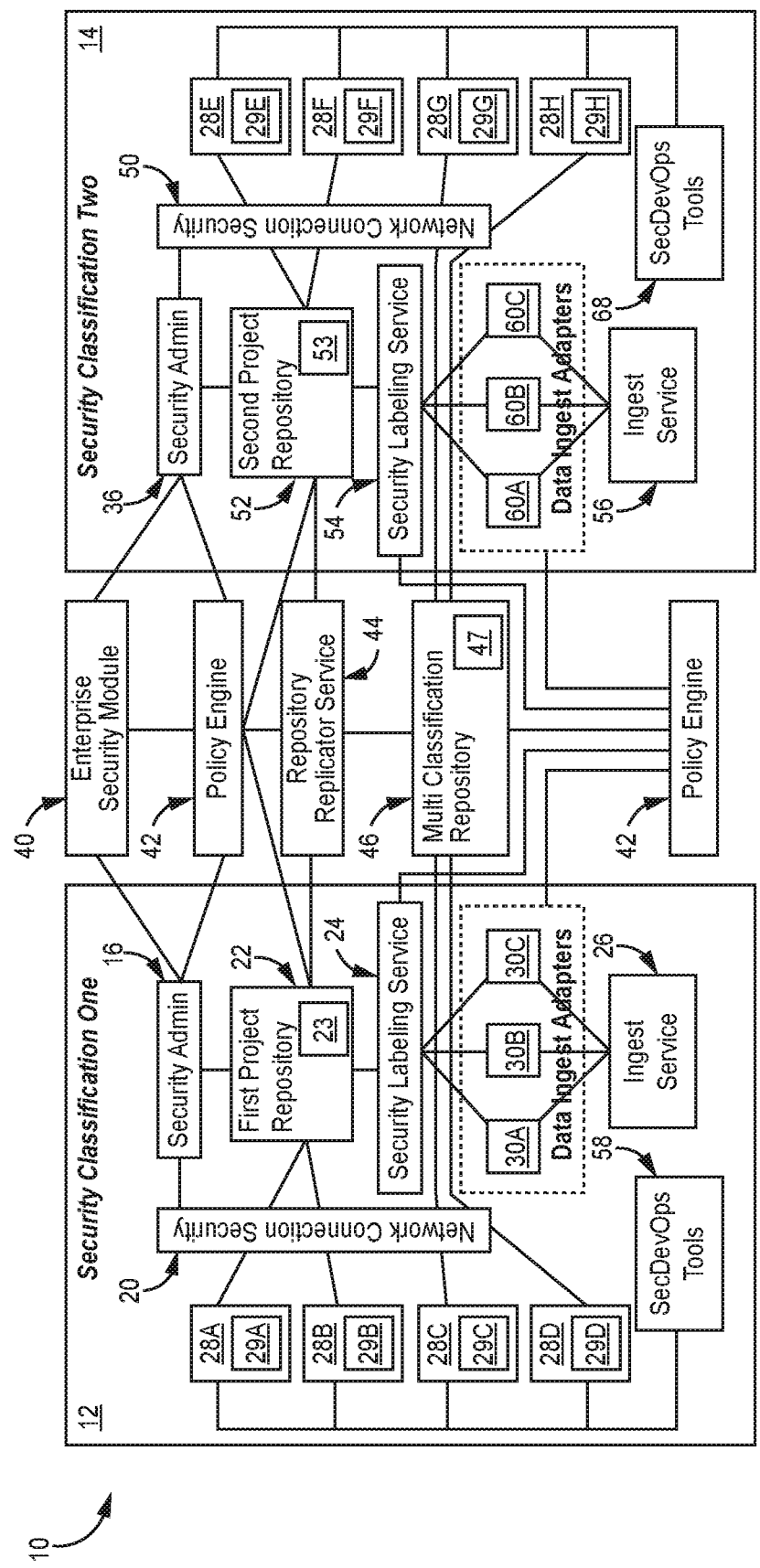
FIG. 1 is a diagram of a multi-tier, multi-compartmented SecDevOps environment.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

An integrated multi-compartment SecDevOps environment affords an organization an efficient and secure method for collaborative development without being encumbered by the complexities of establishing multiple independent levels of security DevOps systems requiring manual information sharing techniques. A multi-tier, multi-compartmented SecDevOps system and method is disclosed herein that includes the ability to partition/compartmentalize the SecDevOps environment depending on the security classification of the individual program/sub-program/component and the security classification of the tenants granted access to the program/sub-program/component (hereinafter referred to generally as the sub-program). The SecDevOps environment is divided based on the project the sub-program is developed/created for and the security classification label affixed/designated to the sub-program. For example, a tenant will have access to the individual sub-program (stored in a project repository that includes sub-programs developed/ created for a particular project) if that tenant has a security clearance authorization at or higher than the designed security classification designation of the sub-program and the tenant has access to the project for which the sub-program is developed/created. The SecDevOps system and method also allows for the sub-program to be transferred to and stored in a repository that includes sub-programs from multiple projects that have the same security classification level label. Tenants with a security classification level at or higher than that security classification level label can access, copy, and/or edit the sub-programs for use in other projects to minimize the need to develop/create the same sub-program multiple times for multiple projects.

The SecDevOps system and method includes other features for designating the security classification label of each sub-program, determining the security clearance authorization for each tenant, and granting access to the repositories by the tenants. The SecDevOps system and method can include various tools for developing/creating, integrating, testing, and releasing the sub-programs and/or overall project within a classified environment supporting information that is categorized as special access required (SAR) data. These tools include both commercial and customized applications and services enabling users to perform their development tasks while ensuring that the sensitivity of the information is protected. These applications and services may be stored locally on tenant workstations, local servers that also store other information such as the contents of the repositories, or in a cloud-based system distant from the tenant work stations and the overall SecDevOps system. These applications and services are made available to the users through multiple methodologies including, for example, infrastructure as a service (IaaS), platform as a service (PaaS), and/or security as a service (SaaS). The tenants can utilize these tools and methodologies to complete tasks necessary to the completion of a particular project. Thus, for example, a tenant workstation may only need to include the ability to access the SecDevOps system tools and may not need to include the ability to store and/or run these tools.

FIG. 1 is a diagram of a multi-tier, multi-compartmented SecDevOps system. FIG. 1 represents a virtual design supporting multiple compartments and projects operating at multiple security classifications. SecDevOps system 10 includes security classification one tier 12, security classification two tier 14, enterprise security admin 40, at least one policy engine 42 (two shown in FIG. 1), repository replicator service 44, and multi-classification repository 46 (which includes copy of first sub-program 47). Security classification one tier 12 includes security admin 16, network connection security 20, first project repository 22 (which includes first sub-program 23), security labeling service 24, ingest service 26, tenants 28A-28D (which include tenant workstations 29A-29D, respectively), data ingest adapters 30A-30C, and SecDevOps tools 58. Security classification two tier 14 includes security admin 36, network connection security 50, second project repository 52 (which includes edited first sub-program 53), security labeling service 54, ingest service 56, tenants 28E-28H (which include tenant workstations 29E-29H, respectively), data ingest adapters 60A-60C, and SecDevOps tools 68.

Enterprise security admin 40 manages and drives policy engine 42. Policy engine 42 defines allowable transfers of sub-programs 23, 47, and 53 by repository replicator service 44 to and from first project repository 22, second project repository 52 and/or multi-classification repository 46. Copy of sub-program 47 from first project repository 22 (and/or second project repository 52) are replicated and stored within multi-classification repository 46. Policy engine 42 provides rules for transactions occurring within and between security admin 16, security admin 36, first project repository 22, and second project repository 52. Security labeling service 24 and security labeling service 54 establish and coordinate the security classification attached to any sub-programs 23/47/ and 53 stored within first project repository 22, second project repository 52, and/or multi-classification repository 46. Security classification one tier 12 and security classification two tier 14 also have file ingest adapters 30A-30B and 60A-60C, respectively, that prepare ingested files for labeling prior to storing with first project repository 22 and second project repository 52.

Security classification one tier 12 can also have tenants 28A-28D that each can have associated individual workstations 29A-29D or groups of workstations (not shown). Tenants 28A-28D security classification processing authorization is partially determined by network connection security 20 as configured by security admin 16.

Although SecDevOps system 10 is illustrated in FIG. 1 with two security classification tiers, SecDevOps system 10 can more generally support any number of security classification tiers, with each tier corresponding to a security classification level of information/programs/projects within SecDevOps system 10. This disclosure discusses security classification two as being a different security classification than security classification one. For example, security classification one can be a secret security classification with SAR compartments orange and blue, and security classification two can be a secret security classification with SAR compartments red, white, and blue. In another example, security classification one can be a low security classification, and security classification two can be a medium security classification. Generally, a tenant with a higher security classification (e.g., a medium security classification) will have access to information at that security classification and at all security classifications lower than that security classification (e.g., a low security classification and an unclassified security classification). However, as discussed below, a tenant with a higher security classification may not have access to a particular project even if the entirety of that project is at a lower security classification.

Additionally, while tenants 28A-28H are described most generally as individuals working on a project within SecDevOps system 10, one or all of tenants 28A-28H can be a group of individuals, such as a team within a government organization and/or a company hired to work on the project, who share a common access with specific privileges to the available SecDevOps tools 58/68. Thus, tenant workstation 29A-29H can be one or multiple workstations with access to at least a portion of SecDevOps system 10 and include SecDevOps tools 58/68 and/or access to DevOps tools 58/68 to carry out tasks within DevOps system 10. Tenant workstations 29A-29H can include local storage media for storing SecDevOps tools 58/68, can include portable storage with the ability to run SecDevOps tools 58/68, and/or can be configured to only provide access to SecDevOps tools 58/68 with the SecDevOps tools being stored and run by SecDevOps system 10. Tenant workstations 29A-29H can include other features and/or configurations not expressly discussed in this disclosure.

SecDevOps system 10 provides multiple tenants 28A-28H (that can have different security classifications) with a robust system for developing/creating, integrating, testing, and releasing projects within a multi-tier classified environment. SecDevOps system 10 provides DevOps tools 58/68 that can be utilized by each tenant 28A-28H within each security classification tier 12/14 to create/develop, integrate, and test each sub-program 23, 47, and 53.

SecDevOps system 10 is divided (i.e., can be physically divided such that information is stored in different storage media in different locations and/or virtually divided such that information is stored on the same storage media but that storage media is partitioned or otherwise virtually divided) into multiple security classification tiers, of which security classification one tier 12 and security classification two tier 14 serve as non-limiting examples. These tiers are used to separate the information based on the security classification label of that information to control which tenants can view, copy, edit, etc. the information within the tier. For example, tenants 28A-28D in FIG. 1 have security classification one authorization, so tenants 28A-28D can see information/sub-programs/projects having a security classification one label as designed by security admin 16 that does security labeling 24 as at least partially defined by policy engine 42. As described below, however, tenants 28A and 28B can view the information (e.g., first sub-program 23) within first project repository 22 (as well as multi-classification repository 46) because tenants 28A and 28B have authorization to view first sub-program 23 and other information associated with the first project that have a security classification one label (i.e., the contents of first project repository 22). Because tenants 28C and 28D are not authorized to view any information/sub-programs associated with the first project, tenants 28C and 28D can only view the information/sub-programs within multi-classification repository 46 (all information/sub-programs within multi-classification repository 46 that has a security classification one label, such as copy of first sub-program 47 that may have any project specific information removed/striped out).

First project repository 22 has a security classification one label (and so are within security level one tier 12). First project repository 22 is a library for sub-programs/components created/developed by the tenants for the first project and includes first sub-program 23. For example, tenant 28A can each create/develop first sub-program 23 for the first project and add (e.g., transfer, save, and/or copy) sub-program 23 to first project repository 22. Then, tenant 28B (which has access to first project repository 22 and a security classification one classification) can view, copy, edit, integrate, test, etc. sub-program 23 in a traditional SecDevOps environment. Before being added to first project repository 22, first sub-program 23 can first get validated to ensure that first sub-program 23 works for its intended use. First sub-program 23 can then get security label one via security labeling 24 by security admin 16 with direction from policy engine 42. In SecDevOps system 10, sub-program 23 is classified as security classification one, which can be a low security classification. However, other SecDevOps systems can have security classification one as an unclassified security classification or a heightened security classification, such as a secret or top security classification. Sub-program 23 can (before or after being labeled) be encrypted to provide security as sub-program 23 is transferred to first project repository 22.

First project repository 22 can be configured to contain only sub-programs for the first project that have a security classification one label, or first project repository 22 can be configured to contain sub-programs for the first project that have any security classification label. However, tenants with a security classification one will only be able to view, edit, copy, etc. the sub-programs having a security classification one label. For example, tenants 28A and 28B can view only sub-programs within first project repository 22 that have a security level one label (such as first sub-program 23), whereas tenants 28E and 28F (which have a security level two classification and, in this example, are authorized to access the project of first project repository 22) can view sub-programs within first project repository 22 that have either a security classification one label or a security classification two label (assuming security level two is a higher security clearance level that security level one).

As shown in FIG. 1, tenants 28A and 28B have access/authorization to first project repository 22 (and thus first sub-program 23) because tenants 28A and 28B, for example, are working on completing the first project. Tenants 28C and 28D do not have access/authorization to first project repository 22 because tenants 28C and 28D, for example, are not working on the first project. However, each of tenants 28A-28D have access/authorization to multi-classification repository 46 because each of tenants 28A-28D have a security classification one authorization. Thus, tenants 28A-28D may have access to copy of first sub-program 47, which was transferred to multi-classification repository 46 for use by tenants not associated with the first project. For example, tenants 28C and 28D can be working on another project that has a security classification one label. For that project, tenants 28C and 28D can copy/transfer useful sub-programs (such as copy of first sub-program 47) from multi-classification repository 46 to that project's repository, eliminating the need to recreate those useful sub-programs. In this example, copy of first sub-program 47 in multi-classification repository 46 is transferred (and then possibly edited to be tailored for the second project) to second project repository 52, shown as edited first sub-program 53. Thus, first sub-program 23 only needs to be created once, thereby saving time and expense.

Multi-classification repository 46 is similar in configuration to first project repository 22, but multi-classification repository 46 includes sub-programs that have a security classification one label for multiple projects (not just the first project, as is the case with first project repository 22). Multi-classification repository 46, by containing/storing multiple sub-programs (such as copy of first sub-program 47) from multiple projects and allowing access by all tenants with at least a security one classification, allows for sub-programs to be copied and transferred to various projects without the need to recreate that particular sub-program. The sub-programs with a security classification one label are added/transferred/copied to multi-classification repository 46 from first project repository 22 (and other project repositories). However, before being transferred to security classification one repository 22, any project-specific information can be stripped out (i.e., removed) from first sub-program 23 so that those tenants without access to the first project (and first project repository 22) do not receive classified information that is relevant to the first project. Additionally, copy of first sub-program 47 can be re-designated/re-labeled via security labeling 24 by security admin 16 with direction from policy engine 42 so as to be transferred to a repository of a different security classification or a different project or remain within multi-classification repository 46 but have a different security classification so as to prevent and/or allow access by tenants with a different security classification.

As with first project repository 22, multi-classification repository 46 can be configured to only contain sub-programs that have a security classification one label, or multi-classification repository 46 can be configured to contain sub-programs that have any security level label (thus, a multi-classification library). However, tenants with a security level one classification will only be able to view, edit, copy, etc. the sub-programs having a security level one label and may not even be able to view a file (e.g., metadata) for a sub-program that has a higher security level classification in multi-classification repository 46.

When first sub-program 23 is added/transferred/copied to any repository, first sub-program 23 will generally first need to be designated with a security classification label (e.g., security labeling service 24/54) by security admin 16/36 and/or enterprise security module 40. Enterprise security module 40 and/or security admin 16/36 can be a software program having software code that, when executed by a computer processor, reviews the sub-program and determines what security level label to affix/designate to the sub-program depending on the contents of the sub-program, such as keywords within the sub-program, information contained in the metadata of the sub-program, the project for which the sub-program was created, and/or other information. Enterprise security module 40 and/or security admin 16/36 can be a machine-learning model that receives various inputs and trials and determines the security classification label. Additionally, security admin 16/36 can include a human that reviews the sub-program and determines what security classification label to attach to the sub-program (e.g., in combination with a software program). The security classification label given to each sub-program is determined or governed by the policies/rules defined in policy engine 42. Policy engine 42 can include rules that set out what security classification label a sub-program gets. For example, a rule that policy engine 42 may define is that any sub-program that includes the word "intercontinental" will get a security classification two, while any sub-program that includes the words "rapid response" will get a security classification one. Enterprise security module 40 and/or security admin 16/36 can receive the rules/policies/guidelines from policy engine 42 and enact those rules for security labeling 24/54. Additionally, policy engine 42 can be incorporated into enterprise security module 40 such that the two components are contained within one computer processor and/or multiple related computer processors.

The components of security classification two tier 14 are similar in functionality and configuration to those associated with security classification one tier 12. However, as shown as an example in FIG. 1, security classification two tier 14 is accessible by tenants 28E-28H from tenant workstations 29E-29H. Tenants 28E and 28F can view the information/sub-programs within second project repository 52 and (as well as multi-classification repository 46) because tenants 28E and 28F have authorization to view the information/sub-programs associated with the second project that have a security classification two label. For example, edited first sub-program 53 has a security classification two label (which is different that first sub-program 23) because edited first sub-program 53 contains information that warrants a different security classification label, and is able to be viewed, copied, edited, etc. by tenants 28E and 28F. Because tenants 28G and 28H are not authorized to view any information/sub-programs associated with the second project, tenants 28G and 28H can only view the information/sub-programs within multi-classification repository 46 (such as copy of first sub-program 47).

Second project repository 52 has a security classification two label, so second project repository 32 stores (is a library for) sub-programs/components created/developed by the tenants for a second project that have a security classification two label (such as edited first sub-program 53). Much like first project repository 22 in security classification one tier 12, second project repository 52 in security classification two tier 14, for example, can include a second sub-program that is created/developed by tenant 28E (which has a security classification two authorization). Then, tenant 28F (which also has access to first project repository 22 and multi-classification repository 46) can view, copy, edit, integrate, test, etc. the second sub-program in a traditional SecDevOps environment. While shown as two different repositories for two different projects, the first project and the second project can be the same project such that first project repository 22 in security classification one tier 12 and second project repository 52 in security classification two tier 14 can be the same repository. In such a configuration, first project repository 22/second project repository 52 store sub-programs having both security classification one and two labels, except that tenants 28A and 28B can only view, copy, edit, etc. sub-programs with a security classification one label, while tenants 28E and 28F can view, copy, edit, etc. all sub-programs with either a security classification one or security classification two label.

Multi-classification repository 46 can include sub-programs that have a security classification two label for multiple projects (not just the second project as is the case with second project repository 32). Multi-classification repository 46, by containing/storing multiple sub-programs from multiple projects and allowing access by all tenants with at least a security classification two authorization, allows for sub-programs to be copied and transferred to various projects without the need to recreate that particular sub-program, thus saving the time and expense needed to recreate the sub-program (such as edited first sub-program 53). The sub-programs with a security classification two label can be added/transferred/copied to multi-classification repository 46 from second project repository 32 (and other project repositories). However, before being transferred to multi-classification repository 46, any project-specific information can be stripped out (i.e., removed) from the sub-program so that those tenants without access to the second project (and second project repository 32) do not receive classified information that is relevant to the second project. Additionally, the copied sub-program can be re-designated/re-labeled via security labeling 24 by security admin 16 with direction from policy engine 42 so as to be transferred to a repository of a different security classification or a different project or remain within multi-classification repository 46 but have a different security classification so as to prevent and/or allow access by tenants with a different security classification.

Enterprise security admin 40 is responsible for the overall security administration of the entire SecDevOps environment 10, and provides direction to each security admin 16/36. Security admin 16/36 establishes policies with network connection security 20/50 to determine if tenants 28A-28H have access/authorization to first project repository 22, second project repository 52, and/or multi-classification repository 46. Network connection security 20/50, based on the policies that originated within policy engine 42, determine the access capability and the security classifications within which the tenant workstations 29A-29H can operate. Tenant workstations 29A and 29B of tenants 28A and 28B, respectively, can access first project repository 22 directly based upon the user that is logged in and the authorization levels established for the workstation. Tenant workstations 29A-29D of tenants 28A-28D, respectively, can also indirectly access multi-classification repository 46 dependent on the formal access rights of the user and that of the tenant workstation. Depending on the approved configuration, SecDevOps system 10 can be configured such that the sub-programs stored within the multi-classification repository 46 can be copied/replicated into first project repository 22 or second project repository 52. The subprogram that is replicated is determined by repository replicator service 44. The basic determination is that those elements that reside in multi-classification repository 46 that are dominated by the security classification of first project repository 22 or second project repository 52, respectively, are duplicated within first project repository 22 and/or second project repository 52 of security classification one tier 12 and security classification two tier 14. Security labeling services 24 and 54 determine what approved set of classification labels may be applied to sub-programs stored with first project repository 22, second project repository 52, and/or multi-classification repository 46. Each of these security labeling services 24 and 54 are managed and controlled by security admins 16 and 36, respectively with the policies being defined by policy engine 42.

Data ingest adapters 30A-30C are associated with security classification one tier 12, while data ingest adapters 60A-60C are associated with security classification two tier 14. Data ingest adapters 30A-30C and 60A-60C prepare ingested sub-programs for labeling. Each sub-program type may or may not be fully interoperable with security labeling services 24 and 54. When the sub-programs are not interoperable, data ingest adapters 30A-30C and 60A-60C are used to establish the required fields to apply the label. Ingest Services 26 and 56 address the need to process non-standard types of sub-programs, such as non-Microsoft file types.

SecDevOps tools 58 and 68 are both COTS and customized tools used to perform DevOps within security classification one tier 12 and security classification two tier 14, respectively. SecDevOps tools 58 and 68 operate at the security classification of each tier (i.e., security classification one and security classification two). Tenants 28A-28H can access SecDevOps tools 58 and 68 existing within each of their specific workstations 29A-29H and/or tiers. SecDevOps tools 58 and 68 can be shared and/or placed in multi-classification repository 46 for transferring between security classifications, compartments, projects, etc.

Multi-classification repository 46 can be configured to only contain sub-programs that have a security classification two label, or multi-classification repository 46 can be configured to contain sub-programs that have any security classification label while limiting access to individual sub-programs depending on tenant security classification authorization. For each project, the project repository can be configured to contain only sub-programs of the associated security classification, or repositories can be configured to contain only sub-programs for a particular project regardless of the security classification of the sub-program while limiting access to individual sub-programs depending on tenant security classification authorization. However, it may be desirable to have physical and/or virtual separation of information/sub-programs of different security classification labels to better guard against higher classified information/sub-programs being accessible by tenants who do not have the security classification authorization to access that information. Thus, multiple, compartmentalized repositories for different security classification tiers generally and for different security classification labels within one project may be advantageous.

Figure 2:
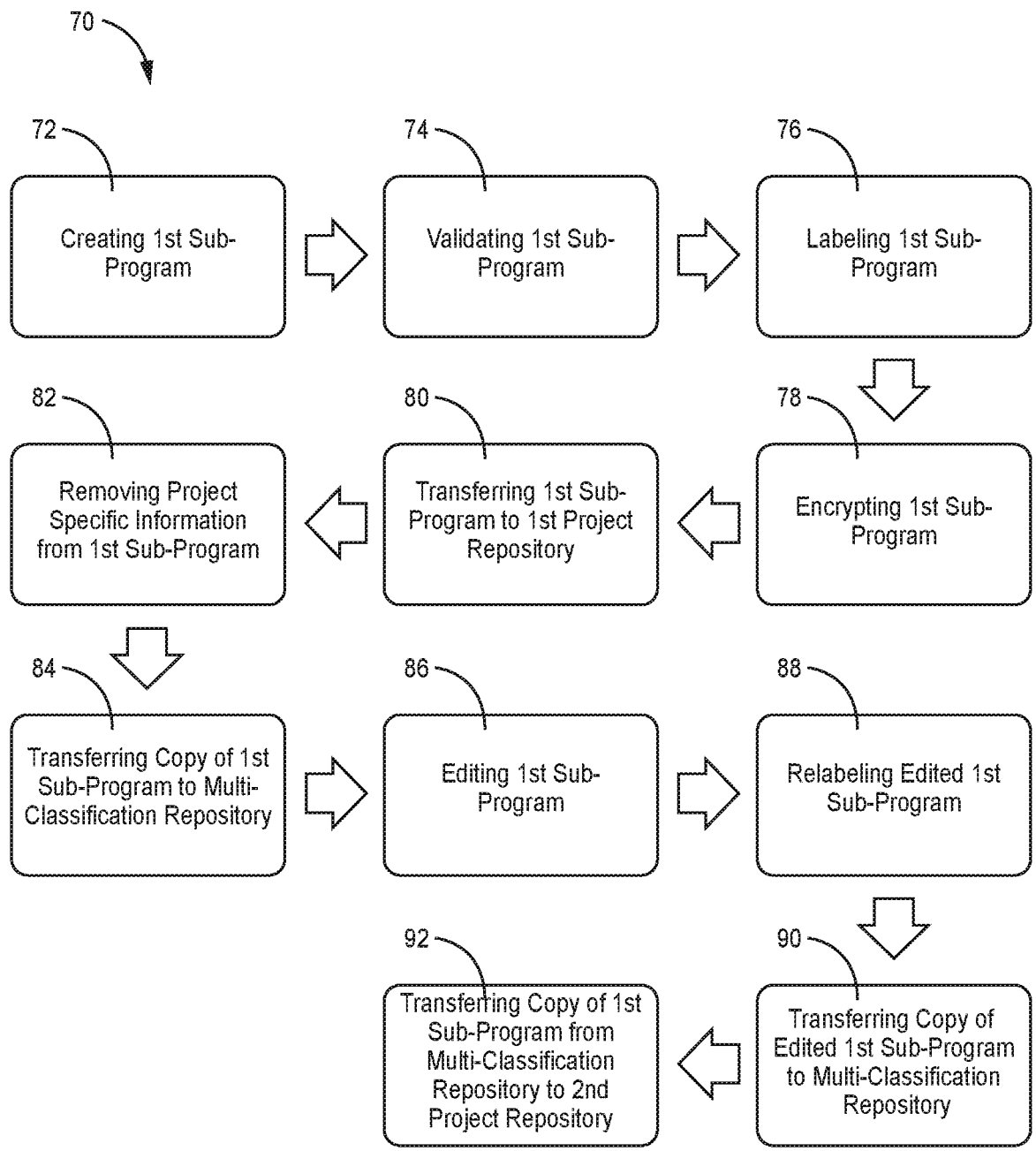
FIG. 2 is a flow chart of a method of providing a SecDevOps system.

FIG. 2 is a flow chart of method 70 of providing and using SecDevOps system 10. Method 70 includes creating first sub-program 72, validating first sub-program 74, labeling first sub-program 76, encrypting first sub-program 78, transferring first sub-program to first project repository 80, removing project specific information from first sub-program 82, transferring copy of first sub-program to multi-classification repository 84, editing first sub-program 86, relabeling edited first sub-program 88, transferring copy of edited first sub-program to multi-classification repository 90, and transferring copy of first sub-program from multi-classification repository to second project repository 92.

First, method 70 includes creating first sub-program 72, which can be carried out by any of tenants 28A-28H at tenant workstations 29A-29H, respectively. In FIG. 1, first sub-program 23 is created by one or both of tenants 28A and 28B. The tenants can be government employees, contractors, part of an unrelated company, or have another roll, and the first sub-program can be any type and/or configuration of information, such as a component of a computer program, a Microsoft word document, or a file in PDF format.

Next, method 70 includes validating first sub-program 74 to ensure first sub-program 23 satisfies its intended purpose. For example, if first sub-program 23 is a component of a computer program, validating first sub-program 23 may include executing/running the sub-program to ensure it completes its intended task. Validating first sub-program 74 could also include reviewing first sub-program 23 to ensure it contains the necessary information. Step 74 may not need to be performed if no validation is needed and/or required.

Method 70 also includes labeling first sub-program 76 with the proper security classification label as disclosed above with regards to FIG. 1, which can be dependent upon the contents of first sub-program 23 and/or the project for which first sub-program 23 was created.

Then, method 70 includes encrypting first sub-program 78 to provide a level of security for first sub-program 23 if first sub-program 23 is to be transferred away from tenant workstations 29A-29H and/or between security classification tiers. Step 78 may not need to be performed if encryption is not needed and/or required. Steps 74, 76, and 78 can be performed in a variety of orders depending on the configuration and policies of SecDevOps system 10.

Next, method 70 includes transferring first sub-program to first project repository 80. Step 80 may not need to be performed if first sub-program 23 is created within the first project repository SecDevOps environment. Transferring first sub-program to the first project repository 80 may entail copying first sub-program 23 (which may be present only on tenant workstation 29A-29H) and pasting/transferring it to first project repository 22, or the transfer can entail establishing a secure network connection via network connection security 20 and satisfying requirements of security admin 16/36, enterprise security module 40, ingest services 26/56, and/or data ingest adapters 30A-30C and/or 60A-60C. The transfer of first sub-program 23 can require further precautions.

Before transferring copy of first sub-program to multi-classification repository 84, step 82 of removing specific information from first sub-program 23 can be performed to ensure that tenants without authorization to the first project cannot view or otherwise access information relevant to the first project within first sub-program 23. Step 82 can be performed by a human, who reviewed first sub-program 23 and removes any project specific information, or can be performed using a software program.

Then, copy of the first sub-program 47 without the project specific information is transferred to multi-classification repository 84. With copy of first sub-program 47 being located within multi-classification repository 46, other tenants who do not have access to first project repository 22 can view, edit, copy, transfer, etc. the copy of first sub-program 47 for use in other projects. For example, the step of editing first sub-program 86 can be performed to tailor first subprogram 23 (e.g., copy of the first sub-program) for use in the second project as edited first sub-program 53. Thus, step 86 can be performed before or after step 92, which is transferring copy of first sub-program from multi-classification repository to second project repository 92.

Additionally, step 88 can be performed, which is relabeling edited first sub-program 86 with the proper security classification label as disclosed in FIG. 1. The editing of first sub-program 23 (to create edited first sub-program 53) may result in the addition and/or deletion of information that changes the security classification label of edited first sub-program 53 to be different from unedited first sub-program 23.

Method 70 can also include transferring copy of edited first sub-program to multi-classification repository 90 to allow for use by other tenants for other projects. Step 82 (removing project specific information) may also need to be performed on the copy of edited first sub-program 53 to ensure that tenants without authorization to the second project cannot view or otherwise access information relevant to the second project within the copy of edited first sub-program 53. Along with step 90, method 70 can also include transferring copy of first sub-program 47 from multi-classification repository to second project repository 92. Step 92 eliminates the need for tenants to create first sub-program 23 multiple times for multiple different projects. As mentioned above, step 92 can be performed before editing first sub-program 86 (and step 86 may not even need to be performed if copy of first sub-program 47 does not need to be modified to accommodate (i.e., fit into) the second project).

While method 70 discloses numerous steps shown in a specific order in FIG. 2, the steps of method 70 can be performed in any order that meets the needs and requirements of tenants 28A-28H and the security and project development requirements of SecDevOps system 10. As disclosed above, one or more steps of method 70 may not need to be performed.

SecDevOps system 10 and method 70 with multiple security classification tiers and multiple projects compartmentalized/separated from one another provides a more secure environment for developing/creating and completing classified projects while also utilizing a DevOps approach. SecDevOps system 10 and method 70 allows for the sharing of information/sub-programs securely among tenants having similar security classifications while also accommodating tenants with lower security classifications working on (or having access to) the same project. SecDevOps system 10 and method 70 enables multiple tenants with different security classifications to utilize the same development and/or physical SecDevOps environment (e.g., a single infrastructure, platform, and/or software) while still maintaining and enforcing strict security policies.

SecDevOps system 10 and method 70 can utilize virtual and physical separation techniques with regards to the storage of sub-programs having different security classification labels and/or being associated with different projects. SecDevOps system 10 and method 70 can use development tools (such as IaaS, IaaP, and SaaS) provided to authorize tenants with cloud resources in the development of multiple projects having various security classifications. SecDevOps system 10 and method 70 can utilize program identifiers attached to each tenant and virtual separation to ensure that each tenant is only able to access information/sub-programs and projects for which the tenant is authorized. SecDevOps system 10 and method 70 provides the ability to quickly establish, operate, maintain classified environments in support of research, development, and test activities across multiple security classifications and projects. SecDevOps system 10 and method 70 can use single physical environment that is segregated based upon security policies, enabling tenants to simultaneously work on a project that spans multiple security classifications. SecDevOps system 10 and method 70 can include cloud-computing services that allow tenants to access compute, storage, and network resources from a shared pool of assets/tools.

SecDevOps tools 58 and 68 can be utilized through a private cloud model. SecDevOps system 10 and method 70 can utilize a robust role-based access control (RBAC) model to tightly control and administer tenant accesses and the allocation of resources/tools. The RBAC model is designed in such a fashion that critical management services are distributed among multiple roles to prevent insider threat activities from potentially affecting system operations. In addition to RBAC, SecDevOps system 10 and method 70 can utilize an array of security techniques including logical and physical separation and encryption to protect system assets and resources. Furthermore, cloud-based concepts (such as micro-segmentation, software-defined networking, and software-defined computing) enable SecDevOps system 10 and method 70 to tightly control project and resource/tool usage as well as connection to devices, storage, and specific data sets. Multi-compartmentalization is enabled through a data marking and labeling approach to ensure data is properly labeled and that only tenants with authorization based on their formal access controls are able to access the data given the location from which the tenant is working.

Discussion of Possible Embodiments

The following are non-exclusive descriptions of possible embodiments of the present invention.

A method of providing a secure development operations system that includes multiple projects, multiple tenants, and multiple security classifications. The method includes creating a first sub-program with the first sub-program being part of a first project, designating the first sub-program with a first security classification label, transferring the first sub-program to a first repository of the development operations system with the first repository being configured to contain sub-programs associated with the first project, and transferring a copy of the first sub-program to a second repository of the development operations system. The second repository is configured to contain sub-programs from multiple projects and sub-programs that have different security classification labels.

The method of the preceding paragraph can optionally include, additionally and/or alternatively, any one or more of the following features, configurations, steps, and/or additional components:

The first sub-program is created by a first tenant and the method further includes editing the first sub-program by a second tenant associated with the first project.

Redesignating a security classification label of the edited first sub-program to a second security classification label, wherein the second security classification label is a more heightened security classification than the first security level label.

Transferring a copy of the edited first sub-program to the second repository.

Transferring a copy of the first sub-program to a third repository associated with a second project.

The third repository is accessible by all tenants with an authorization to access the second project.

The second repository is accessible by all tenants within the secure operations development system.

The first repository is accessible by tenants associated with the first project and the first sub-program in the first repository is accessible by tenants with a first security classification authorization.

Removing all information specific to the first project from the copy of the first sub-program before transferring the copy of the first sub-program to the second repository.

The first project is a software program.

Storing the first repository being at a location distant from the first tenant.

The first repository is stored via a cloud-based storage system.

Encrypting the first sub-program.

Validating the first sub-program to ensure the first sub-program meets intended specification for the first sub-program.

Evaluating a security classification authorization of a third tenant and, if the security classification authorization of the third tenant is a first security classification authorization, granting access to the third tenant to view, copy, and edit the copy of the first sub-program in the second repository.

A system for performing development operations in a secure environment includes a first tenant workstation at which a first tenant is configured to create a first sub-program with the first sub-program being part of a first project and having a first security classification label designation, a first repository for storage of the first sub-program with the first repository configured to store sub-programs associated with the first project, a second repository for storage of a copy of the first sub-program with the second repository configured to store sub-programs from multiple projects, and an enterprise security module that controls access to the first repository and the second repository. Access to the first repository is limited to tenants associated with the first project and access to the copy of the first sub-program in the second repository being limited to tenants with a first security classification authorization.

The system of the preceding paragraph can optionally include, additionally and/or alternatively, any one or more of the following features, configurations, steps, and/or additional components:

A second tenant workstation at which a second tenant is configured to edit the first sub-program, wherein the edited first sub-program is redesignated with a second security classification label.

A third repository for storage of the edited first sub-program with the third repository being configured to store sub-programs associated with a second project.

The enterprise security module controls access to the third repository with the third repository being accessible by tenants with authorization to access the second project.

A cloud-based storage system that includes the first repository.

The first project is a software program.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of providing a secure development operations system that includes multiple projects, multiple tenants, and multiple security classifications, the method comprising:
creating, via a computer processor, a first sub-program, the first sub-program being part of a first project;
designating, via the computer processor, the first sub-program with a first security classification label;
transferring the first sub-program to a first repository of the development operations system, the first repository being stored within storage media and configured to contain sub-programs associated with the first project;
transferring a copy of the first sub-program to a second repository of the development operations system, the second repository being stored within storage media and configured to contain sub-programs from multiple projects and sub-programs that have different security classification labels; and
granting access to the second repository by tenants having a first security classification authorization or a security classification authorization that is higher than the first security classification authorization.

2. The method of claim 1, wherein the first sub-program is created by a first tenant, the method further comprising:
editing the first sub-program by a second tenant associated with the first project.

3. The method of claim 2, further comprising:
redesignating a security classification label of the edited first sub-program to a second security classification label,
wherein the second security classification label is a more heightened security classification than the first security level label.

4. The method of claim 2, further comprising:
transferring a copy of the edited first sub-program to the second repository.

5. The method of claim 2, further comprising:
transferring a copy of the first sub-program to a third repository associated with a second project.

6. The method of claim 5, wherein the third repository is accessible by all tenants with an authorization to access the second project.

7. The method of claim 1, wherein the second repository is accessible by all tenants within the secure operations development system.

8. The method of claim 1, wherein the first repository is accessible by tenants associated with the first project, and wherein the first sub-program in the first repository is accessible by tenants with a first security classification authorization.

9. The method of claim 1, further comprising:
removing all information specific to the first project from the copy of the first sub-program before transferring the copy of the first sub-program to the second repository.

10. The method of claim 1, wherein the first project is a software program.

11. The method of claim 1, further comprising:
storing the first repository being at a location distant from the first tenant.

12. The method of claim 11, wherein the first repository is stored via a cloud-based storage system.

13. The method of claim 1, further comprising:
validating the first sub-program to ensure the first sub-program meets intended specification for the first sub-program.

14. The method of claim 1, further comprising:
evaluating a security classification authorization of a third tenant; and
if the security classification authorization of the third tenant is a first security classification authorization, granting access to the third tenant to view, copy, and edit the copy of the first sub-program in the second repository.

15. A system for performing development operations in a secure environment, the system comprising:
a first tenant workstation at which a first tenant is configured to create a first sub-program, the first sub-program being part of a first project and having a first security classification label designation;
a first repository for storage of the first sub-program, the first repository configured to store sub-programs associated with the first project;
a second repository for storage of a copy of the first sub-program, the second repository configured to store sub-programs from multiple projects; and
an enterprise security module that controls access to the first repository and the second repository, access to the first repository being limited to tenants associated with the first project and access to the copy of the first sub-program in the second repository being limited to tenants with a first security classification authorization.

16. The system of claim 15, further comprising:
a second tenant workstation at which a second tenant is configured to edit the first sub-program,
wherein the edited first sub-program is redesignated with a second security classification label.

17. The system of claim 16, further comprising:
a third repository for storage of the edited first sub-program, the third repository configured to store sub-programs associated with a second project.

18. The system of claim 16, wherein the enterprise security module controls access to the third repository with the third repository being accessible by tenants with authorization to access the second project.

19. The system of claim 15, further comprising:
a cloud-based storage system that includes the first repository.

20. The system of claim 15, wherein the enterprise security module includes a policy engine that defines rules that govern access to the first repository and the second repository.

* * * * *